United States Patent
Wang et al.

(10) Patent No.: US 12,212,133 B2
(45) Date of Patent: Jan. 28, 2025

(54) MEDIUM-VOLTAGE PHOTOVOLTAIC GRID-CONNECTED INVERTER SYSTEM AND PHOTOVOLTAIC POWER GENERATION SYSTEM

(71) Applicant: Sungrow Power Supply Co., Ltd., Hefei (CN)

(72) Inventors: Hang Wang, Hefei (CN); Li Ren, Hefei (CN); Peng Sun, Hefei (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 173 days.

(21) Appl. No.: 17/915,411

(22) PCT Filed: Sep. 17, 2021

(86) PCT No.: PCT/CN2021/118974
§ 371 (c)(1),
(2) Date: Sep. 28, 2022

(87) PCT Pub. No.: WO2022/121431
PCT Pub. Date: Jun. 16, 2022

(65) Prior Publication Data
US 2023/0134016 A1    May 4, 2023

(30) Foreign Application Priority Data
Dec. 7, 2020  (CN) .......................... 202011426066.9

(51) Int. Cl.
*H02H 7/122* (2006.01)
*H02J 3/00* (2006.01)
(Continued)

(52) U.S. Cl.
CPC ........... *H02H 7/122* (2013.01); *H02J 3/0012* (2020.01); *H02J 3/381* (2013.01); *H02M 7/537* (2013.01); *H02J 2300/24* (2020.01)

(58) Field of Classification Search
CPC ...... H02J 3/42; H02J 3/38; H02J 3/381; H02J 3/0012; H02J 2300/24; H02M 7/537; H02H 7/122; H02H 7/1227; Y02E 10/56
(Continued)

(56) References Cited

U.S. PATENT DOCUMENTS

| | | | |
|---|---|---|---|
| 2012/0039101 A1* | 2/2012 | Falk | H02J 3/42 363/95 |
| 2018/0254628 A1* | 9/2018 | Schelenz | H02M 7/125 |

(Continued)

FOREIGN PATENT DOCUMENTS

| | | |
|---|---|---|
| CN | 103762126 A | 4/2014 |
| CN | 104485692 A | 4/2015 |

(Continued)

OTHER PUBLICATIONS

Machine translation of Kurokami et al. Japanese Patent Document JP H11-095849 A Apr. 1999 (Year: 1999).*

(Continued)

*Primary Examiner* — Kevin J Comber
(74) *Attorney, Agent, or Firm* — Wolf, Greenfield & Sacks, P.C.

(57) ABSTRACT

A medium-voltage grid-connected photovoltaic inverter system includes: a photovoltaic inverter, a medium-voltage transformer, a medium-voltage switch, and an inverter grid-connected controller. A direct current input terminal of the photovoltaic inverter is connected to a direct current bus. A low-voltage side of the medium-voltage transformer is connected to an alternating current output terminal of the photovoltaic inverter. An input terminal of the medium-voltage switch is connected to a high-voltage side of the medium-voltage transformer, and an output terminal of the medium-voltage switch is configured to be connected to a medium-voltage grid. A current sensor is integrated in the (Continued)

medium-voltage switch to detect a grid-connected current of the photovoltaic inverter system and output a current detection signal.

9 Claims, 1 Drawing Sheet

(51) Int. Cl.
  *H02J 3/38* (2006.01)
  *H02M 7/537* (2006.01)
(58) Field of Classification Search
  USPC .......................................................... 361/18
  See application file for complete search history.

(56) References Cited

U.S. PATENT DOCUMENTS

| | | | | |
|---|---|---|---|---|
| 2019/0157982 | A1* | 5/2019 | Brueckner | H02M 7/125 |
| 2019/0258212 | A1 | 8/2019 | Morton et al. | |
| 2020/0365346 | A1* | 11/2020 | Telefus | H02H 1/0092 |

FOREIGN PATENT DOCUMENTS

| | | |
|---|---|---|
| CN | 211908388 U | 11/2020 |
| CN | 112398175 A | 2/2021 |
| DE | 10 2012 105 724 A1 | 1/2014 |
| JP | 11095849 A * | 4/1999 |

OTHER PUBLICATIONS

T. S. Basu and S. Maiti, "A Hybrid Modular Multilevel Converter for Solar Power Integration," in IEEE Transactions on Industry Applications, vol. 55, No. 5, pp. 5166-5177, Sep.-Oct. 2019, doi: 10.1109/TIA.2019.2928245. (Year: 2019).*
International Search Report and Written Opinion for International Application No. PCT/CN2021/118974, mailed Dec. 1, 2021.
First Office Action for Chinese Application No. 202011426066.9, dated Jul. 5, 2022.
Examination Report for Indian Patent Application No. 202247055863, dated Feb. 8, 2024.

* cited by examiner

MEDIUM-VOLTAGE PHOTOVOLTAIC GRID-CONNECTED INVERTER SYSTEM AND PHOTOVOLTAIC POWER GENERATION SYSTEM

This application is a national stage filing under 35 U.S.C. § 371 of International Patent Application Serial No. PCT/CN2021/118974, filed Sep. 17, 2021, which claims the priority to Chinese patent application No. 202011426066.9, titled "MEDIUM-VOLTAGE PHOTOVOLTAIC GRID-CONNECTED INVERTER SYSTEM AND PHOTOVOLTAIC POWER GENERATION SYSTEM", filed on Dec. 7, 2020 with the China National Intellectual Property Administration. The contents of these applications are incorporated herein by reference in their entireties.

FIELD

The present disclosure relates to the technical field of photovoltaic power generation, and in particular to a medium-voltage grid-connected photovoltaic inverter system and a photovoltaic power generation system.

BACKGROUND

In an existing technical solution, such as "grid-connected photovoltaic inverter system and photovoltaic power generation system using the same", a medium-voltage grid-connected contactor is generally connected between a high-voltage side of a booster transformer and a medium-voltage grid. Two detection terminals of a grid-connected voltage detection circuit are connected to both ends of the medium-voltage grid-connected contactor respectively. A detection result of voltages detected at two ends of the medium-voltage contactor is outputted to a first control circuit. A direct current voltage detection circuit detects a direct current voltage UDC and outputs a result to the first control circuit and a second control circuit. A grid-connected current detection circuit detects a grid-connected current at an alternating current output terminal of a photovoltaic inverter, and outputs a result to the second control circuit. The second control circuit controls the inverter to start or stop based on the detection result of the direct current voltage and the detection result of the grid-connected current. The first control circuit controls the medium-voltage grid-connected contactor to switch off or on based on a detection result of a direct current input voltage and a detection result of a grid-connected voltage, so that the photovoltaic inverter is disconnected from or connected to the grid. In the existing technical solution, the photovoltaic inverter system is disconnected from or connected to a medium-voltage grid by controlling the medium-voltage grid-connected contactor to switch off or on. However, the existing technical solution has a disadvantage that an external current detection circuit is essential to detect a grid-connection current, resulting in a large size and high cost. In addition, the current detection circuit is arranged at the low-voltage side and thus fails to detect a short circuit at the medium-voltage side before the photovoltaic inverter system is connected to the grid.

SUMMARY

A medium-voltage grid-connected photovoltaic inverter system and a photovoltaic power generation system are provided according to the present disclosure, for implementing short circuit protection for the medium-voltage grid-connected photovoltaic inverter system.

In order to implement the short circuit protection for the medium-voltage grid-connected photovoltaic inverter system, a medium-voltage grid-connected photovoltaic inverter system is provided according to the present disclosure. The medium-voltage grid-connected photovoltaic inverter system includes: a photovoltaic inverter, a medium-voltage transformer, a medium-voltage switch, and an inverter grid-connected controller. A direct current input terminal of the photovoltaic inverter is connected to a direct current bus. A low-voltage side of the medium-voltage transformer is connected to an alternating current output terminal of the photovoltaic inverter. An input terminal of the medium-voltage switch is connected to a high-voltage side of the medium-voltage transformer, and an output terminal of the medium-voltage switch is configured to be connected to a medium-voltage grid. A current sensor is integrated in the medium-voltage switch and is configured to detect a grid-connected current of the medium-voltage grid-connected photovoltaic inverter system and output a current detection signal. The inverter grid-connected controller is configured to control the photovoltaic inverter to stop and/or control the medium-voltage switch to switch off in response to reception of a grid-connected command, if it is determined based on the current detection signal that the grid-connected current of the medium-voltage grid-connected photovoltaic inverter system is greater than a preset current threshold.

Optionally, the medium-voltage grid-connected photovoltaic inverter system further includes a direct current bus voltage detection circuit. A detection terminal of the direct current bus voltage detection circuit is connected to the direct current bus, an output terminal of the direct current bus voltage detection circuit is connected to the inverter grid-connected controller. The direct current bus voltage detection circuit is configured to detect a voltage of the direct current bus, and generate a direct current bus voltage detection signal. The inverter grid-connected controller is further configured to control the photovoltaic inverter to start if it is determined based on the direct current bus voltage detection signal that the voltage of the direct current bus is greater than a first preset voltage threshold.

Optionally, the medium-voltage grid-connected photovoltaic inverter system further includes a grid-connected voltage detection circuit. A first detection terminal of the grid-connected voltage detection circuit is connected to the high-voltage side of the medium-voltage transformer, and a second detection terminal of the grid-connected voltage detection circuit is configured to be connected to a side of the medium-voltage grid. The grid-connected voltage detection circuit is configured to detect a voltage at the high-voltage side of the medium-voltage transformer and a voltage at the side of the medium-voltage grid, and generate a grid-connected voltage detection signal. The inverter grid-connected controller is further configured to control the medium-voltage switch to switch on if it is determined based on the grid-connected voltage detection signal that a line voltage currently detected at the high-voltage side of the medium-voltage transformer and a line voltage currently detected at the side of the medium-voltage grid meet a grid-connected condition.

Optionally, the inverter grid-connected controller is further configured to control, after controlling the medium-voltage switch to switch on, the photovoltaic inverter to stop, if it is determined based on the current detection signal and the grid-connected voltage detection signal that a grid-connected power of the medium-voltage grid-connected photovoltaic inverter system is less than a preset power threshold.

Optionally, the inverter grid-connected controller is further configured to control, after controlling the medium-voltage switch to switch on, the medium-voltage switch to switch off, if it is determined based on the direct current bus voltage detection signal that the voltage of the direct current bus is less than the first preset voltage threshold for a first preset period of time.

Optionally, the grid-connected condition is that a line voltage at the high-voltage side of the medium-voltage transformer and a line voltage at the side of the medium-voltage grid have the same phase, same phase sequence and same amplitude.

Optionally, the medium-voltage grid-connected photovoltaic inverter system further includes an ambient light sensor. An output terminal of the ambient light sensor is connected to the inverter grid-connected controller. The ambient light sensor is configured to detect ambient light, and output an ambient light detection signal. The inverter grid-connected controller is further configured to control the medium-voltage switch to switch off if it is determined based on the ambient light detection signal that the currently detected ambient light is less than a preset threshold.

Optionally, the inverter grid-connected controller is further configured to control the medium-voltage switch to switch on in response to reception of a reactive power transmission signal.

Optionally, the medium-voltage switch includes one or more of a medium-voltage circuit breaker, a medium-voltage load switch and a medium-voltage contactor.

Optionally, the medium-voltage grid-connected photovoltaic inverter system further includes an alternating current bus voltage detection circuit. The alternating current bus voltage detection circuit is connected to the alternating current output terminal of the photovoltaic inverter, and is configured to detect an alternating current bus voltage outputted by the photovoltaic inverter. The inverter grid-connected controller is further configured to control the medium-voltage switch to switch on if it is determined based on the alternating current bus voltage that a line voltage currently detected at the high-voltage side of the medium-voltage transformer and a line voltage currently detected at the side of the medium-voltage grid meet a grid-connected condition.

A photovoltaic power generation system is further provided according to the present disclosure. The photovoltaic power generation system includes a medium-voltage power system and the medium-voltage grid-connected photovoltaic inverter system.

In the present disclosure, an alternating current output side of a photovoltaic inverter is connected to a low-voltage side of a medium-voltage transformer, a high-voltage side of the medium-voltage transformer is connected to a medium-voltage switch, and an output side of the medium-voltage switch is connected to a medium-voltage grid, whereby a medium-voltage grid-connected photovoltaic inverter system based on a medium-voltage switch is formed. Moreover, a current sensor is integrated in the medium-voltage switch so as to detect a current at a grid-connected side. Therefore, before the system is connected to a grid, the grid-connected controller controls, in response to reception of a grid-connected command, the photovoltaic inverter to stop, that is, suspend the startup, or controls the medium-voltage switch to switch off or remains open, if it is determined based on the current detection signal that a grid-connected current I detected by the current sensor integrated in the medium-voltage switch is greater than the preset current threshold, that is, a short circuit occurs between a medium-voltage side and a grid-connected side, thereby realizing short circuit protection of the medium-voltage grid-connected photovoltaic inverter system.

BRIEF DESCRIPTION OF THE DRAWINGS

For more clearly illustrating technical solutions in embodiments of the present disclosure or the technical solution in the conventional technology, drawings referred to describe the embodiments or the conventional technology will be briefly described hereinafter. Apparently, the drawings in the following description show only some embodiments of the present disclosure. Other drawings may be obtained by those skilled in the art based on the structure shown in the drawings without any creative efforts.

LIST OF REFERENCE NUMERALS

Figure 1:
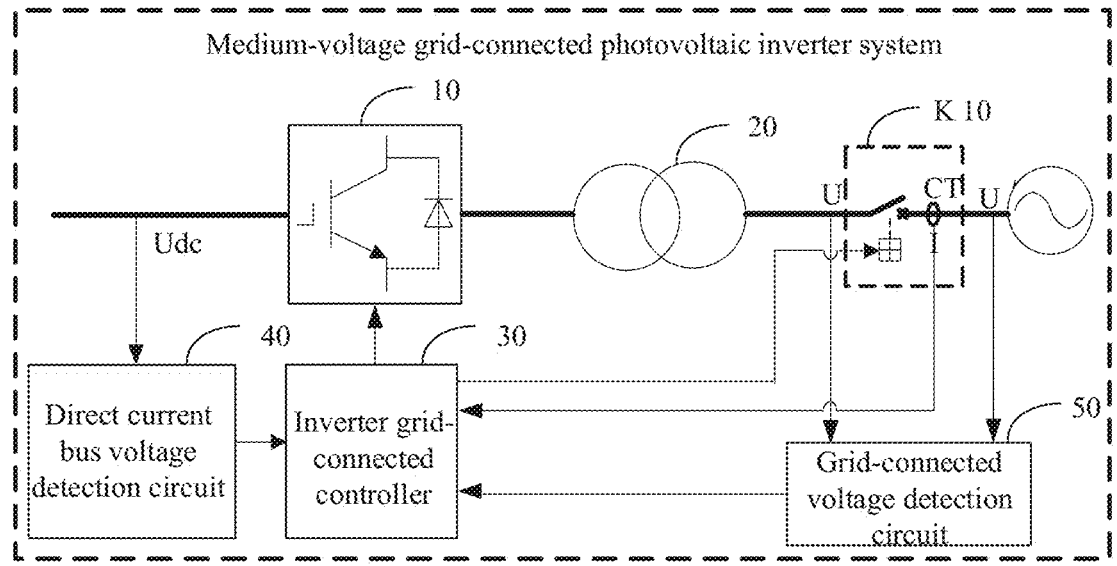
FIG. 1 is a schematic structural diagram illustrating a medium-voltage grid-connected photovoltaic inverter system according to an embodiment of the present disclosure.

| Reference numerals | Names |
| --- | --- |
| 10 | Photovoltaic inverter |
| 20 | Medium-voltage transformer |
| 30 | Inverter grid-connected controller |
| 40 | Direct current bus voltage detection circuit |
| 50 | Grid-connected detection circuit |
| K10 | Medium-voltage switch |
| CT | Current sensor |

Objects, functional features and advantages of the present disclosure will be further described in conjunction with the embodiments and with reference to the drawings.

DETAILED DESCRIPTION

The technical solutions in the embodiments of the present disclosure will be described clearly and completely hereinafter in conjunction with the drawings in the embodiments of the present disclosure. Apparently, the described embodiments are only a part rather than all of the embodiments of the present disclosure. All other embodiments obtained by those skilled in the art based on the embodiments of the present disclosure without any creative work fall in the protection scope of the present disclosure.

It should be noted that, if there is directional indicator (such as up, down, left, right, front, back) in the embodiments of the present disclosure, the directional indicator is only for explaining a relative position, a relative movement or the like between components in a certain posture (as shown in the drawings). The directional indicator varies with the posture.

In addition, if there are descriptions related to "first" and "second" in the embodiments of the present disclosure, the descriptions of "first" and "second" are only for illustration purposes, rather than understood as indicating or implying its relative importance or implicitly indicating the number of the indicated technical features. Therefore, the feature defined with "first" and "second" includes at least one feature explicitly or implicitly. In addition, technical solutions in the various embodiments may be combined with each other, and the combined technical solution is to be implemented by those skilled in the art. A combination of technical solutions that is contradictory or impossible to be implemented does not exist and is not within the protection scope of the present disclosure.

A medium-voltage grid-connected photovoltaic inverter system is provided according to the present disclosure. The medium-voltage grid-connected photovoltaic inverter system is applied to a photovoltaic power generation system.

Referring to FIG. 1, in an embodiment of the present disclosure, the medium-voltage grid-connected photovoltaic inverter system includes: a photovoltaic inverter 10, a medium-voltage transformer 20, a medium-voltage switch K10, and an inverter grid-connected controller 30.

A direct current input terminal of the photovoltaic inverter 10 is connected to a direct current bus.

A low-voltage side of the medium-voltage transformer 20 is connected to an alternating current output terminal of the photovoltaic inverter 10.

An input terminal of the medium-voltage switch K10 is connected to a high-voltage side of the medium-voltage transformer 20, and an output terminal of the medium-voltage switch K10 is configured to be connected to a medium-voltage grid. A current sensor CT is integrated in the medium-voltage switch K10, and is configured to detect a grid-connected current of the medium-voltage grid-connected photovoltaic inverter system and output a current detection signal.

The inverter grid-connected controller 30 is connected to a controlled terminal of the medium-voltage switch K10 and an output terminal of the current sensor CT. The inverter grid-connected controller 30 is configured to, in response to reception of a grid-connected command, control the photovoltaic inverter 10 to stop and/or control the medium-voltage switch K10 to switch off when it is determined based on the current detection signal that the grid-connected current of the medium-voltage grid-connected photovoltaic inverter system is greater than a preset current threshold.

In this embodiment, the inverter converts direct current power generated by a solar cell or direct current power from a battery into alternating current power required by a load. There may be multiple inverters in an inverter system. Respective alternating current sides of the multiple inverters may be connected in parallel directly, or via another device such as a switch. The medium-voltage transformer 20 is configured to step-up a low voltage to a medium-voltage. A transformation ratio, a voltage level, a power level and a type of the transformer each vary with the inverter system. The transformer may be a double split transformer or a double-winding transformer, which is not specifically limited herein. The medium-voltage switch K10 may be one of a medium-voltage circuit breaker, a medium-voltage load switch or a medium-voltage contactor. It can be understood that, in this embodiment, the medium-voltage switch K10 includes, but is not limited to, the above switches via which the inverter system is connected to or disconnected from the grid. In other embodiments, the medium-voltage switch K10 may include another switch, which is not limited herein. Moreover, a medium-voltage switch K10 between two photovoltaic power generation systems may be identical to or different from a medium-voltage switch K10 between other two photovoltaic power generation systems. Each phase at the output end of the medium-voltage switch K10 includes two terminals. In the photovoltaic power generation system including the medium-voltage grid-connected photovoltaic inverter system, output terminals of medium-voltage switches K10 respectively in the multiple medium-voltage grid-connected photovoltaic inverter systems are directly connected to each other via the bus cable, and a medium-voltage switch K10 in a first of the multiple medium-voltage grid-connected photovoltaic inverter systems and a medium-voltage switch K10 in a last of the multiple medium-voltage grid-connected photovoltaic inverter systems each are connected to a medium-voltage power system, to form a ring network.

The current sensor CT, such as a hall sensor, a shunt, and a current detection probe, is integrated in the medium-voltage switch K10. The current sensor CT is packaged integrally with other electronic components in the medium-voltage switch K10, so as to detect a current at a grid-connected side of the photovoltaic power generation system, and generate a current detection signal. The current sensor CT is integrated into the medium-voltage switch K10, without increasing the size, and the production cost can be reduced. In addition, the current at the medium-voltage side, that is, the grid-connected side can be detected by the current sensor CT integrated in the medium-voltage switch K10, so that the current at a grid-connected point can be monitored in real time.

The inverter grid-connected controller 30 performs communications, and implements functions such as medium-voltage measurement and control, and intelligent control on medium-voltage switching for a power station. The inverter grid-connected controller 30 is configured to, in response to various detection signals, for example, a current detection signal of the photovoltaic power generation system, control the medium-voltage switch K10 to switch on in order to connect the photovoltaic power generation system to the grid, that is, in response to reception of a grid-connected command, or control the medium-voltage switch K10 to switch off in order to disconnect the photovoltaic power generation system from the grid. The inverter grid-connected controller 30, in response to reception of the grid-connected command and when it is determined based on the current at the grid-connected side detected by the current sensor CT, that is, the current detected by a grid-connected current-current sensor CT of the medium-voltage grid-connected photovoltaic inverter system that the medium-voltage side is short-circuited or a contact of the medium-voltage switch K10 is welded, stops the medium-voltage grid-connected photovoltaic inverter system from being connected to the grid. In a case that the medium-voltage grid-connected photovoltaic inverter system is off-grid, it is determined that the electrical connection between the medium-voltage side and the grid-connected side is cut off if the current sensor CT integrated in the medium-voltage switch K10 detects that the grid-connected current is less than the preset current threshold, for example, the grid-connected current I is 0A or approximates to 0A. The inverter grid-connected controller 30 controls the photovoltaic inverter 10 to start, or controls the medium-voltage switch K10 to switch on. It is determined that a short circuit occurs between the medium-voltage side and the grid-connected side if the current sensor CT integrated in the medium-voltage switch K10 detects that the grid-connected current I is greater than the preset current threshold. The inverter grid-connected controller 30 controls the photovoltaic inverter 10 to stop, that is, suspend the startup, or controls the medium-voltage switch K10 to switch off or remains open.

In the present disclosure, an alternating current output side of a photovoltaic inverter 10 is connected to a low-voltage side of a medium-voltage transformer 20, a high-voltage side of the medium-voltage transformer 20 is connected to a medium-voltage switch K10, and an output side of the medium-voltage switch K10 is connected to a medium-voltage grid, whereby a medium-voltage grid-connected photovoltaic inverter system based on a medium-voltage switch K10 is formed. Moreover, a current sensor CT is integrated in the medium-voltage switch K10 so as to detect the current at a grid-connected side. Therefore, before the system is connected to a grid, the grid-connected controller controls, in response to reception of a grid-connected command, the photovoltaic inverter 10 to stop, that is, suspend the startup or controls the medium-voltage switch K10 to switch off or remains open if it is determined based on the current detection signal that the grid-connected current I detected by the current sensor CT integrated in the medium-voltage switch K10 is greater than the preset current threshold, that is, a short circuit occurs between a medium-voltage side and a grid-connected side, thereby realizing short circuit protection of the medium-voltage grid-connected photovoltaic inverter system. A medium-voltage grid-connected photovoltaic inverter system based on a switch integrated with a current sensor is provided according to the present disclosure. An alternating current output side of a photovoltaic inverter is connected to a low-voltage side of a medium-voltage transformer, a high-voltage side of the medium-voltage transformer is connected to a medium-voltage switch K10 (including but not limited to a medium-voltage circuit breaker, a contactor, a load switch and other medium-voltage switchgear) integrated with a current sensor. An output side of the medium-voltage switch K10 is connected to a medium-voltage grid. The integrated current sensor CT detects a grid-connected current at a medium-voltage side of the system. The medium-voltage grid-connected photovoltaic inverter system is connected to a grid at the medium-voltage side via the medium-voltage switch K10 integrated with the current sensor, without an external current detection circuit, thereby reducing the size and cost. In addition, the current sensor CT is arranged at the medium-voltage side. Before the system is connected to a grid, in a case of a short circuit at the medium-voltage side or in a case that a contact of the medium-voltage switch is welded, the system is stopped from being connected to the grid when the current sensor detects a current.

In an embodiment, the medium-voltage grid-connected photovoltaic inverter system further includes: a direct current bus voltage detection circuit 40. A detection terminal of the direct current bus voltage detection circuit 40 is connected to the direct current bus. An output terminal of the direct current bus voltage detection circuit 40 is connected to the inverter grid-connected controller 30. The direct current bus voltage detection circuit 40 is configure to detect a voltage of the direct current bus, and generate a direct current bus voltage detection signal.

The inverter grid-connected controller 30 is further configured to control the photovoltaic inverter 10 to start if it is determined based on the direct current bus voltage detection signal that the voltage of the direct current bus is greater than a first preset voltage threshold.

In this embodiment, the direct current bus voltage detection circuit 40 may be implemented by a direct current bus voltage transformer. The direct current bus voltage detection circuit 40 detects a direct current bus voltage Udc at the input terminal of the photovoltaic inverter 10, and sends a generated direct current bus voltage detection signal to the inverter grid-connected controller 30. The first preset voltage threshold is a minimum grid-connected voltage, that is, a minimum startup voltage. In a case that the photovoltaic inverter 10 is in a sleep mode, the inverter grid-connected controller 30 controls the photovoltaic inverter 10 to start if it is determined based on the direct current bus voltage detection signal that the voltage of the direct current bus is greater than the first preset voltage threshold, that is, the direct current bus voltage detected by the direct current bus voltage detection circuit 40 is greater than the preset minimum startup voltage.

In a case that the photovoltaic inverter 10 is connected to the grid already, the photovoltaic inverter 10 stops in response to a result that the direct current bus voltage Udc is less than the minimum startup voltage. That is, the photovoltaic inverter 10 switches to the sleep mode. The inverter grid-connected controller 30 sends an opening command to the medium-voltage switch K10 in response to a determination result that the direct current bus voltage inputted to the photovoltaic inverter 10 is less than a minimum operation voltage, to switch off the medium-voltage switch K10, and the medium-voltage grid-connected inverter system based on the medium-voltage switch K10 is disconnected from the grid. The minimum operation voltage is 1.414 times a ratio of a voltage at any terminal of the medium-voltage switch to a transformation ratio of the booster transformer.

In an embodiment, the medium-voltage grid-connected photovoltaic inverter system further includes a grid-connected voltage detection circuit 50. A first detection terminal of the grid-connected voltage detection circuit 50 is connected to the high-voltage side of the medium-voltage transformer 20. A second detection terminal of the grid-connected voltage detection circuit 50 is connected to a side of the medium-voltage grid. The grid-connected voltage detection circuit 50 is configured to detect a voltage at the high-voltage side of the medium-voltage transformer 20 and a voltage at the side of the medium-voltage grid, and generate a grid-connected voltage detection signal.

The inverter grid-connected controller 30 is further configured to control the medium-voltage switch K10 to switch on if it is determined based on the grid-connected voltage detection signal that a line voltage currently detected at the high-voltage side of the medium-voltage transformer 20 and a line voltage currently detected at the side of the medium-voltage grid meet a grid-connected condition.

The grid-connected condition is that the line voltage at the high-voltage side of the medium-voltage transformer 20 and the line voltage at the side of the medium-voltage grid have the same phase, same phase sequence and same amplitude.

In practice, a line voltage U' at the first detection terminal and a line voltage U at the second detection terminal may be detected by the grid-connected voltage detection circuit 50. The line voltage U' may include a line voltage Uab' between an A-phase and a B-phase and a line voltage Ubc' between a B-phase and a C-phase. The line voltage U at the second detection terminal includes a line voltage Uab between the A-phase and the B-phase and a line voltage Ubc between the B-phase and the C-phase. In a case that Uab', Ubc', Uab and Ubc all have the same amplitude, Uab' and Uab have the same phase, and Ubc' and Ubc have the same phase, a line voltage between a B-phase and a C-phase and a line voltage between an A-phase and a C-phase at each of the two detection terminals (i.e., Ubc', Uac', Ubc and Uac) may be detected separately. Alternatively, a line voltage between an A-phase and a B-phase and a line voltage between an A-phase and a C-phase at each of the two detection terminals (i.e., Uab', Uac', Uab, and Uac) are detected separately. The subsequent comparison and determination may refer to the above description, and are not repeated here.

In this embodiment, the medium-voltage grid-connected photovoltaic inverter system based on the medium-voltage switch K10 is off-grid, the photovoltaic inverter 10 is started and is in the sleep mode. The grid-connected voltage detection circuit detects the voltage U at the high-voltage side of the medium-voltage transformer 20 and the voltage U' at the side of the medium-voltage grid, and sends a grid-connected voltage detection signal to the inverter grid-connected controller 30. If it is determined that the line voltage currently detected at the high-voltage side of the medium-voltage transformer 20 and the line voltage currently detected at the side of the medium-voltage grid meet a grid-connected condition, the inverter grid-connected controller 30 sends a closing command to the medium-voltage switch, so that the medium-voltage switch is switched on and the inverter is connected to the grid. The grid-connected condition is that the line voltage at the high-voltage side of the medium-voltage transformer 20 and the line voltage at the side of the medium-voltage grid have the same phase, same phase sequence and same amplitude.

In an embodiment, the inverter grid-connected controller 30, after controlling the medium-voltage switch K10 to switch on, controls the photovoltaic inverter 10 to stop if it is determined based on the current detection signal and the grid-connected voltage detection signal that a grid-connected power of the medium-voltage grid-connected photovoltaic inverter system is less than a preset power threshold.

In this embodiment, the preset power threshold may be a minimum grid-connected power. In a case that the photovoltaic inverter 10 is connected to the grid already, the current sensor CT outputs a current detected at the grid-connected side to the inverter grid-connected controller 30. The inverter grid-connected controller 30 calculates a grid-connected power P based on the current at the grid-connected side and a grid-connected voltage detection signal, that is, the line voltage at the high-voltage side of the medium-voltage transformer 20, and determines whether the grid-connected power P is less than a preset minimum grid-connected power P0. If it is determined that the grid-connected power P is less than the preset minimum grid-connected power P0, the inverter grid-connected controller 30 generates an inverter stop control signal to control the photovoltaic inverter 10 to stop. That is, the photovoltaic inverter 10 switches to the sleep mode.

In an embodiment, the inverter grid-connected controller 30 is further configured to, after controlling the medium-voltage switch K10 to switch on, control the medium-voltage switch K10 to switch off if it is determined based on the direct current bus voltage detection signal that the voltage of the direct current bus is less than the first preset voltage threshold for a first preset period of time.

In this embodiment, a voltage fluctuation may occur in the process that a photovoltaic cell assembly or a storage battery supplies electrical energy to the direct current bus, so that the direct current bus voltage detection circuit 40 detects that the direct current bus voltage Udc is less than the minimum grid-connected voltage for only a short period of time. In this case, the inverter grid-connected controller 30 sending an opening command to the medium-voltage switch K10 may result in malfunction. Therefore, in this embodiment, after the photovoltaic inverter 10 switches to the sleep mode and when the direct current bus voltage Udc is less than the minimum grid-connected voltage for a period of time (that is, the first preset period of time), the inverter grid-connected controller 30 sends the opening command to the medium-voltage switch K10, the medium-voltage switch K10 is switched off, and the medium-voltage grid-connected inverter system based on the medium-voltage switch K10 is disconnected from the grid.

In this embodiment, with the medium-voltage switch K10, the photovoltaic power generation system is connected to a grid at the medium-voltage side rather than a low-voltage side. The medium-voltage switch K10 is controlled to switch on, so that the photovoltaic power generation system is connected to the grid. That is, after the photovoltaic inverter 10 is started, the medium-voltage switch K10 is switched on, so that the photovoltaic system is connected to the grid. After the photovoltaic inverter 10 stops, the medium-voltage switch K10 is switched off, so that the photovoltaic system is disconnected from the grid. In this embodiment, the booster transformer is disconnected from the medium-voltage grid while the medium-voltage switch K10 is switched off, without consuming grid energy when the photovoltaic inverter 10 is in the sleep mode. In this embodiment, the no-load loss when the booster transformer is in a sleep mode can also be avoided, thereby improving the efficiency of the photovoltaic system.

Referring to FIG. 1, in an embodiment, the medium-voltage grid-connected photovoltaic inverter system further includes an alternating current bus voltage detection circuit (not shown in the drawings).

The alternating current bus voltage detection circuit is connected to the alternating current output terminal of the photovoltaic inverter. The alternating current bus voltage detection circuit is configured to detect an alternating current bus voltage outputted by the photovoltaic inverter.

The inverter grid-connected controller 30 is further configured to control the medium-voltage switch to switch on if it is determined based on the alternating current bus voltage that the line voltage currently detected at the high-voltage side of the medium-voltage transformer and the line voltage currently detected at the side of the medium-voltage grid meet a grid-connected condition.

In this embodiment, the medium-voltage grid-connected photovoltaic inverter system is off-grid, after the photovoltaic inverter 10 is started, the alternating current bus voltage detection circuit detects the alternating current bus voltage Uac of the photovoltaic inverter 10. The grid-connected voltage detection circuit 50 integrated in the medium-voltage switch K10 detects the line voltage U' at the grid-connected side of the medium-voltage switch K10. A detection result is then sent to the inverter grid-connected controller 30. The inverter grid-connected controller 30 converts Uac to a voltage at the medium-voltage side of the medium-voltage switch K10 and compares the converted voltage with the line voltage U' at the grid-connected side. If it is determined that the grid-connected condition is met, the inverter grid-connected controller 30 sends a closing command to the medium-voltage switch K10, to switch on the medium-voltage switch K10, so that the inverter is connected to the grid. In this embodiment, in a case that the alternating current bus voltage of the photovoltaic inverter 10 is detected by the alternating current bus voltage detection circuit and is converted into the voltage at the medium-voltage side of the medium-voltage switch K10, the grid-connected voltage detection circuit 50 is arranged at an output side of the medium-voltage switch. In other embodiments, a grid-connected voltage detection circuit for detecting an output voltage of the photovoltaic inverter 10 may be arranged at an input side of the medium-voltage switch K10, so as to obtain the voltage at the medium-voltage side of the medium-voltage switch K10, thereby improving detection accuracy of the system.

Referring to FIG. 1, in an embodiment, the inverter grid-connected controller 30 is further configured to control the medium-voltage switch K10 to switch on in response to reception of a reactive power transmission signal.

In this embodiment, the inverter grid-connected controller 30 may also receive a reactive power transmission signal. The controller may receive a nighttime reactive power transmission signal (SVG work instruction) issued by an upper-level grid dispatching center. When the photovoltaic inverter 10 is to send reactive power to the grid at night, the inverter grid-connected controller 30 sends a closing command to the medium-voltage switch K10 based on the reactive power transmission signal, so that the medium-voltage switch K10 is switched on, and the inverter is connected to the grid, thereby realizing medium-voltage grid connection and outputting reactive power. In order to stop the nighttime SVG function, the inverter grid-connected controller 30 sends an opening command to the medium-voltage switch K10, the medium-voltage switch K10 is switched off, and the medium-voltage grid-connected inverter system based on the medium-voltage switch K10 is disconnected from the grid. In this way, the medium-voltage transformer 20 is connected to the grid while sending reactive power to the grid, thereby avoiding no-load loss of the medium-voltage transformer 20 in the ring network, and reducing power loss of the system compared with the conventional solution.

The operation principle of the medium-voltage grid-connected photovoltaic inverter system according to the present disclosure applied to the photovoltaic power generation system is described in combination with the above embodiments of the medium-voltage grid-connected photovoltaic inverter system.

A medium-voltage grid-connected photovoltaic inverter system based on a medium-voltage switch K10 integrated with a current sensor CT includes a photovoltaic inverter 10, a medium-voltage transformer 20, a medium-voltage switch K10 integrated with a current sensor CT (including but not limited to a medium-voltage circuit breaker, a contactor, a load switch and other medium-voltage switchgear), a direct current bus voltage detection circuit 40, a grid-connected controller 30 for the photovoltaic inverter 10, and a grid-connected voltage detection circuit 50.

An alternating current output side of the photovoltaic inverter 10 is connected to a low-voltage side of the medium-voltage transformer 20, and a high-voltage side of the medium-voltage transformer 20 is connected to the medium-voltage switch K10. The direct current bus voltage detection circuit 40 detects a direct current bus voltage Udc of the photovoltaic inverter 10. The current sensor CT integrated in the medium-voltage switch K10 detects a grid-connected current I on the medium-voltage switch K10. The grid-connected voltage detection circuit 50 detects the voltages U (i.e., a voltage at the high-voltage side of the transformer) and U' (i.e., a grid voltage) at both sides of the medium-voltage switch K10. The detected direct current bus voltage, grid-connected current and grid-connected voltage signal are sent to the grid-connected controller 30 for the photovoltaic inverter 10. The grid-connected controller 30 controls the photovoltaic inverter 10 to start or stop and the medium-voltage switch K10 to switch off or on.

In a case that the medium-voltage grid-connected photovoltaic inverter system based on the switch integrated with the current sensor CT is off-grid, the grid-connected current I detected by the current sensor CT integrated in the medium-voltage switch K10 has a value of 0, and the direct current voltage detected by the direct current voltage detection circuit is greater than the preset minimum startup voltage, the grid-connected controller 30 for the photovoltaic inverter 10 starts the photovoltaic inverter 10. Then, the grid-connected voltage detection circuit 50 detects a line voltage U at the high-voltage side of the medium-voltage transformer 20 and a line voltage U' at a side of the medium-voltage grid, and sends a detection result to the grid-connected controller 30. If it is determined that a grid-connected condition is met, the grid-connected controller 30 sends a closing command to the medium-voltage switch K10, so that the medium-voltage switch K10 is switched on, and the photovoltaic inverter 10 is connected to the grid.

In a case that the medium-voltage grid-connected photovoltaic inverter system based on the switch integrated with the current sensor CT is connected to the grid already, the current sensor CT integrated in the medium-voltage switch K10 detects a grid-connected current I, and sends a detection result to the grid-connected controller 30 for the photovoltaic inverter 10. If a grid-connected power P calculated by the grid-connected controller based on the detected grid-side voltage U' and the current I is less than a preset value P0, the grid-connected controller 30 controls the photovoltaic inverter 10 to stop. The direct current bus voltage detection circuit 40 detects an input bus voltage Udc at a direct current side of the photovoltaic inverter 10, and sends a detection result to a grid-connected control system for the photovoltaic inverter 10. The grid-connected controller 30 sends the opening command to the medium-voltage switch K10 in repose to a result that Udc is lower than the minimum grid-connected voltage for a period of time, to switch off the medium-voltage switch K10, so that the medium-voltage grid-connected photovoltaic inverter system based on the switch integrated with the current sensor CT is disconnected from the grid.

When the photovoltaic inverter 10 is to send reactive power to a grid at night, the grid-connected controller 30 sends the closing command to the medium-voltage switch K10 so as to connect the photovoltaic inverter 10 to the grid.

A photovoltaic power generation system is further provided according to the present disclosure. The photovoltaic power generation system includes a medium-voltage power system and multiple above-mentioned medium-voltage grid-connected photovoltaic inverter systems. The detailed structure of the medium-voltage grid-connected photovoltaic inverter system may refer to the above-mentioned embodiments, and thus is not repeated here. It can be understood that, since the photovoltaic power generation system according to the present disclosure includes the above medium-voltage grid-connected photovoltaic inverter system, the embodiments of the photovoltaic power generation system according to the present disclosure include all technical solutions in all embodiments of the medium-voltage grid-connected photovoltaic inverter system, and have the same technical effects as the embodiments of the medium-voltage grid-connected photovoltaic inverter system, which are not repeated here.

Figure 2:
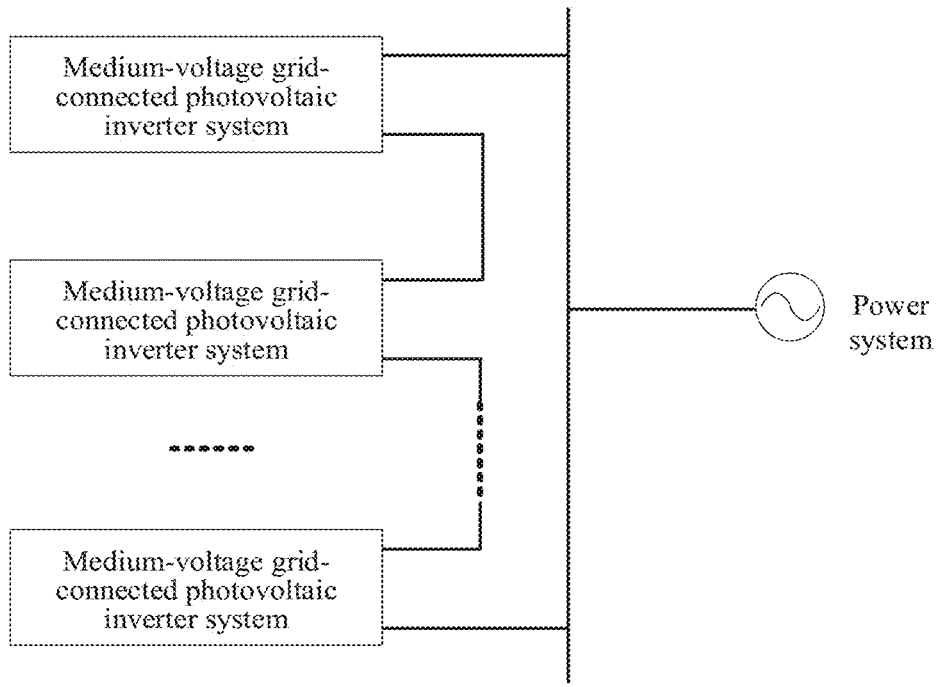
FIG. 2 is a schematic structural diagram illustrating a photovoltaic power generation system according to an embodiment of the present disclosure.

Referring to FIG. 2, in an embodiment, the number of medium-voltage grid-connected photovoltaic inverter system is more than one, and the more than one medium-voltage grid-connected photovoltaic inverter systems are connected to each other via the output terminals of respective medium-voltage switches K10.

In this embodiment, in the photovoltaic power generation system including the more than one voltage grid-connected photovoltaic inverter system, output ends of medium-voltage switches K10 respectively in the medium-voltage grid-connected photovoltaic inverter systems are directly connected to each other via the bus cable, and a medium-voltage switch K10 in a first of the medium-voltage grid-connected photovoltaic inverter systems and a medium-voltage switch K10 in a last of the multiple medium-voltage grid-connected photovoltaic inverter systems each are connected to the medium-voltage power system, to form a ring network. In order to form a ring network, that is, be connected to the grid, all medium-voltage grid-connected photovoltaic inverter systems except a first medium-voltage grid-connected photovoltaic inverter system and a last medium-voltage grid-connected photovoltaic inverter system are connected to each other via the output ends of their respective medium-voltage switches K10 and the bus cable, and the medium-voltage switch K10 in the first medium-voltage grid-connected photovoltaic inverter system and the medium-voltage switch K10 in the last medium-voltage grid-connected photovoltaic inverter system each are connected to the medium-voltage power system, thereby forming the ring network finally. In case of an open circuit, that is, when the inverter system is disconnected from the grid, the two output terminals in the inverter system are still connected to an adjacent medium-voltage grid-connected photovoltaic inverter system. That is, a single off-grid medium-voltage grid-connected photovoltaic inverter system does not affect the ring network formed by other medium-voltage grid-connected photovoltaic inverter systems.

Only optional embodiments of the present disclosure are described above, and are not intended to limit the patent scope of the present disclosure. Any equivalent structural transformation made based on the specification and the drawings of the present disclosure or direct/indirect application in other related technical fields without departing from the concept of the present disclosure is included in the protection scope of the present disclosure.

The invention claimed is:

1. A medium-voltage grid-connected photovoltaic inverter system, comprising:
   a photovoltaic inverter, wherein a direct current input terminal of the photovoltaic inverter is connected to a direct current bus;
   a medium-voltage transformer, wherein a low-voltage side of the medium-voltage transformer is connected to an alternating current output terminal of the photovoltaic inverter;
   a medium-voltage switch, wherein an input terminal of the medium-voltage switch is connected to a high-voltage side of the medium-voltage transformer, an output terminal of the medium-voltage switch is configured to be connected to a medium-voltage grid, a current sensor is integrated in the medium-voltage switch and is configured to detect a grid-connected current of the medium-voltage grid-connected photovoltaic inverter system and output a current detection signal; and
   an inverter grid-connected controller configured to control the photovoltaic inverter to stop and/or control the medium-voltage switch to switch off in response to reception of a grid-connected command, if it is determined based on the current detection signal that the grid-connected current of the medium-voltage grid-connected photovoltaic inverter system is greater than a preset current threshold, wherein the inverter grid-connected controller is further configured to control the medium-voltage switch to switch on in response to reception of a reactive power transmission signal, and the reactive power transmission signal indicates that the photovoltaic inverter is required to send reactive power to the medium-voltage grid.

2. The medium-voltage grid-connected photovoltaic inverter system according to claim 1, further comprising:
   a direct current bus voltage detection circuit, wherein a detection terminal of the direct current bus voltage detection circuit is connected to the direct current bus, an output terminal of the direct current bus voltage detection circuit is connected to the inverter grid-connected controller, and the direct current bus voltage detection circuit is configured to detect a voltage of the direct current bus and generate a direct current bus voltage detection signal,
   wherein the inverter grid-connected controller is further configured to control the photovoltaic inverter to start if it is determined based on the direct current bus voltage detection signal that the voltage of the direct current bus is greater than a first preset voltage threshold.

3. The medium-voltage grid-connected photovoltaic inverter system according to claim 2, further comprising:
   a grid-connected voltage detection circuit, wherein a first detection terminal of the grid-connected voltage detection circuit is connected to the high-voltage side of the medium-voltage transformer, a second detection terminal of the grid-connected voltage detection circuit is configured to be connected to a side of the medium-voltage grid, and the grid-connected voltage detection circuit is configured to detect a voltage at the high-voltage side of the medium-voltage transformer and a voltage at the side of the medium-voltage grid, and generate a grid-connected voltage detection signal,
   wherein the inverter grid-connected controller is further configured to control the medium-voltage switch to switch on if it is determined based on the grid-connected voltage detection signal that the voltage currently detected at the high-voltage side of the medium-voltage transformer and the voltage currently detected at the side of the medium-voltage grid meet a grid-connected condition.

4. The medium-voltage grid-connected photovoltaic inverter system according to claim 3, wherein the inverter grid-connected controller is further configured to control, after controlling the medium-voltage switch to switch on, the photovoltaic inverter to stop, if it is determined based on the current detection signal and the grid-connected voltage detection signal that a grid-connected power of the medium-voltage grid-connected photovoltaic inverter system is less than a preset power threshold.

5. The medium-voltage grid-connected photovoltaic inverter system according to claim 3, wherein the inverter grid-connected controller is further configured to control, after controlling the medium-voltage switch to switch on, the medium-voltage switch to switch off, if it is determined based on the direct current bus voltage detection signal that the voltage of the direct current bus is less than the first preset voltage threshold for a first preset period of time.

6. The medium-voltage grid-connected photovoltaic inverter system according to claim 3, wherein the grid-connected condition is that a line voltage at the high-voltage side of the medium-voltage transformer and a line voltage at the side of the medium-voltage grid have the same phase, same phase sequence and same amplitude.

7. The medium-voltage grid-connected photovoltaic inverter system according to claim 3, further comprising:
   an alternating current bus voltage detection circuit, wherein the alternating current bus voltage detection circuit is connected to the alternating current output terminal of the photovoltaic inverter and is configured to detect an alternating current bus voltage outputted by the photovoltaic inverter,
   wherein the inverter grid-connected controller is further configured to control the medium-voltage switch to switch on if it is determined based on the alternating current bus voltage that a line voltage currently detected at the high-voltage side of the medium-voltage transformer and a line voltage currently detected at the side of the medium-voltage grid meet the grid-connected condition.

8. The medium-voltage grid-connected photovoltaic inverter system according to claim 1, wherein the medium-voltage switch comprises one or more of a medium-voltage circuit breaker, a medium-voltage load switch, and a medium-voltage contactor.

9. A photovoltaic power generation system, comprising:
   a medium-voltage power system; and
   the medium-voltage grid-connected photovoltaic inverter system according to claim 1.

* * * * *